United States Patent [19]

Faccia

[11] Patent Number: 5,452,861
[45] Date of Patent: Sep. 26, 1995

[54] ROTATING SILAGE EXTRACTOR AND CONVEYOR ARM

[76] Inventor: Tiziano Faccia, Via Padova 102, 35026 Conselve (Prov. of Padova), Italy

[21] Appl. No.: 284,864

[22] Filed: Aug. 2, 1994

[30] Foreign Application Priority Data

Aug. 3, 1993 [IT] Italy .................... PD93A0170

[51] Int. Cl.⁶ .................... B02C 21/02; B02C 23/02
[52] U.S. Cl. .................... 241/101.72; 241/186.35; 241/186.4; 241/605
[58] Field of Search .................... 241/101.7, 186.35, 241/186.4, 605

[56] References Cited

U.S. PATENT DOCUMENTS

| | | | |
|---|---|---|---|
| 2,092,102 | 9/1937 | Wilson | 241/186.35 X |
| 2,762,141 | 9/1956 | Le Tourneau | 241/101.7 X |
| 3,779,408 | 12/1973 | Ivie | 214/145 |
| 4,157,164 | 6/1979 | Helm et al. | 241/101.7 |
| 4,591,432 | 5/1986 | Hartl | 209/247 |
| 4,683,924 | 8/1987 | Cornelius | 241/101.7 X |
| 5,127,589 | 7/1992 | Willibald | 241/101.7 |
| 5,402,950 | 4/1995 | Blair et al. | 241/101.7 |

FOREIGN PATENT DOCUMENTS

| | | |
|---|---|---|
| 0383175 | 8/1990 | European Pat. Off. . |
| 0415466 | 3/1991 | European Pat. Off. . |
| 2757921 | 6/1979 | Germany . |

*Primary Examiner*—Mark Rosenbaum
*Assistant Examiner*—John M. Husar
*Attorney, Agent, or Firm*—Guido Modiano; Albert Josif

[57] ABSTRACT

Silage extractor and conveyor arm including an elongated box-like structure which contains means for conveying the material extracted from the silo. A first end of the structure is provided with a mill for cutting and removing loose or ensiled material, and a second end of the structure is articulated, about a horizontal axis, to a vertically extending support which is mounted on a supporting frame. The arm is characterized in that the support to which it is articulated is rotatably coupled to the supporting frame about a vertical axis.

20 Claims, 2 Drawing Sheets

ROTATING SILAGE EXTRACTOR AND CONVEYOR ARM

BACKGROUND OF THE INVENTION

The present invention relates to a rotating silage extractor and conveyor arm.

Arms used particularly but not exclusively in the zootechnical field to load machines for shredding, mixing and distributing fodder, forage, fibrous products etc., are known; one type of arm includes a box-like structure in which the material, cut and/or removed by a mill located at one end, is conveyed and transferred for loading by a conveyor belt contained in the arm.

The end of the box-like structure that lies opposite to the mill is articulated about a horizontal axis to a support which can be constituted directly by the mixing container, by a vertical upright fixed to the frame of the mixing container, or by an upright fixed to an independent self-propelled vehicle.

As mentioned, the arm is articulated about a horizontal axis to allow the mill to move vertically downwards and erode the front of the silage.

In order to perform multiple milling actions on the silage it is necessary to move the silage extractor arm with a series of maneuvers that must be executed by moving the vehicle supporting it.

This naturally entails a waste of time.

SUMMARY OF THE INVENTION

A principal aim of the present invention is to provide a silage extractor and conveyor arm which is capable of performing multiple milling actions, and thus loading operations of user machines, for each position in which it is placed with respect to the front of the loose product or of the product to be extracted from the silo.

A consequent primary object is to speed up the loading of shredder-mixer trucks for fibrous products for zootechny.

Another object is to provide a silage extractor and conveyor arm which has a simple structure and is easy to manufacture.

Another object is to provide a silage extractor and conveyor arm that can be manufactured with commonly commercially available elements and materials.

With this aim, these objects and others in view, there is provided, according to the present invention, a silage extractor and conveyor arm of the type comprising an elongated box-like structure which contains means for conveying the material extracted from the silo, a first end of said structure being provided with a mill for cutting and/or removing the loose or ensiled material, a second end of said structure being articulated, about a horizontal axis, to a vertically extending support which is mounted on a supporting frame, characterized in that said support is rotatably coupled to said supporting frame about a vertical axis.

BRIEF DESCRIPTION OF THE DRAWINGS

Further characteristics and advantages of the silage extractor and conveyor arm according to the invention will become apparent from the following detailed description of a preferred embodiment thereof, illustrated only by way of non-limitative example in the accompanying drawings, wherein.

DESCRIPTION OF THE PREFERRED EMBODIMENTS

Figure 1:
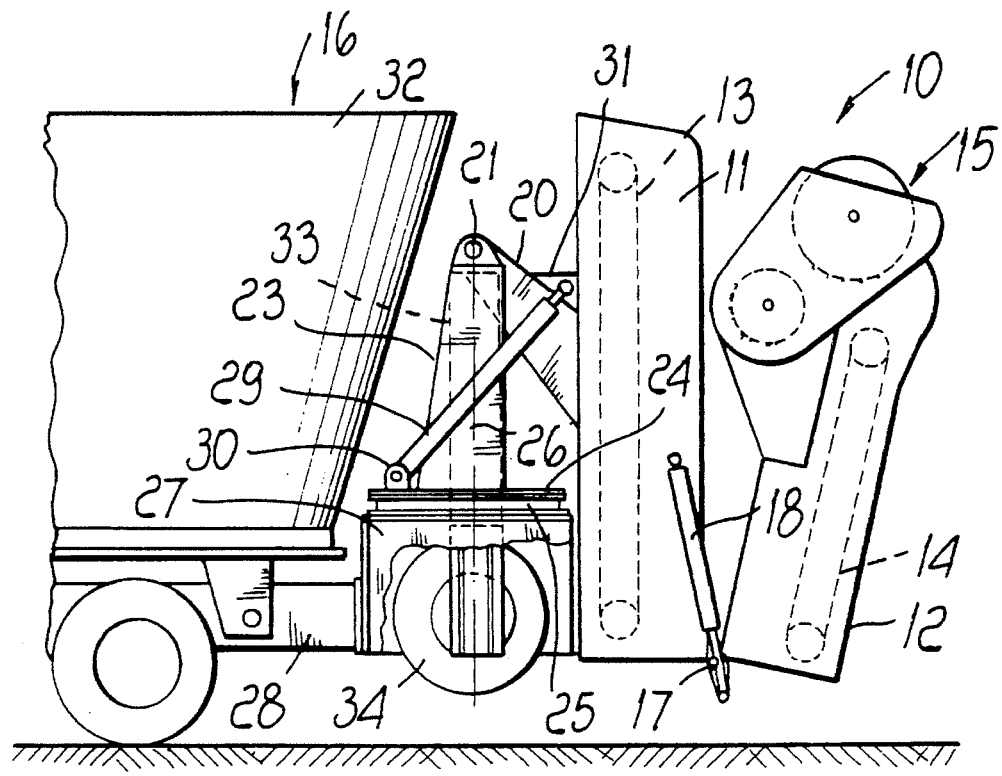
FIG. 1 is a partial side view of a shredder-mixer truck for fibrous products on which the silage extractor and conveyor arm according to the invention, shown in inactive position, is mounted.
Figure 2:
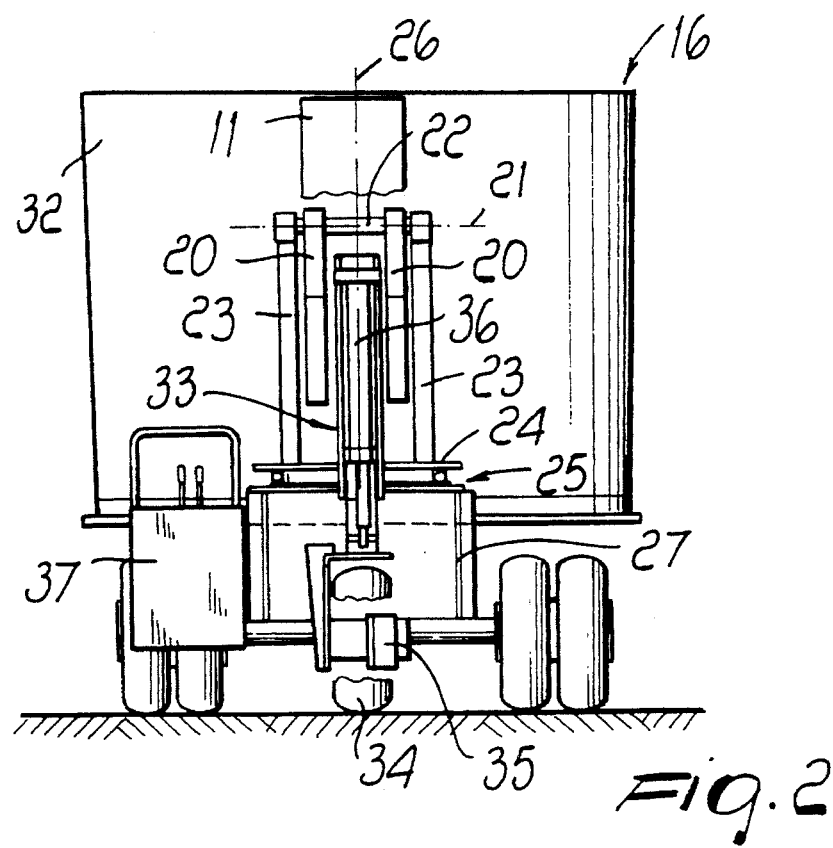
FIG. 2 is a rear view of the truck of FIG. 1, with the arm shown in partial cross-section.

With reference to the above figures, a silage extractor and conveyor arm is generally designated by the reference numeral 10 and comprises a box-like structure which is preferably made of metal plates and is formed by two mutually articulated consecutive portions 11 and 12 which are suitable to be folded when inactive.

Each portion 11 and 12 internally contains a corresponding conveyor belt, respectively 13 and 14, for conveying the material extracted from the silo by an end mill 15 towards the inside of a shredder-mixer truck 16 for fibrous products which is partially shown in the figures and with which the arm 10 is coupled at a free end thereof.

The box-like portions 11 and 12 are articulated about a transverse axis 17, which lies above the mating region, by means of a pair of hydraulic cylinders 18 or by means of a hydraulic reduction unit.

Articulation about the axis 17 occurs by means of a hinge 19.

According to the invention, two parallel arms 20 are fixed to the portion 11 and are articulated about a horizontal axis 21 by means of a pivot 22 to two vertical parallel uprights 23 rising from a lower base 24 which is mounted on a fifth wheel 25 and can rotate about a vertical axis 26 on a lower supporting frame 27 which is fixed to the rear of the chassis 28 of the truck 16.

For articulation about the axis 21 there is a hydraulic cylinder 29 which is fixed between supports 30 and 31 that extend respectively from the base 24 and from the portion 11 of the arm 10.

Articulation about the axis 26 is provided by motorizing the fifth wheel 25, for example with a hydraulic motor or with a piston which are not shown in the figures.

It should also be stressed that the length of the arm 10 is such that it ends above the container 32 of the truck 16 so as to directly discharge the conveyed material into said container.

A telescopic post 33 is fixed to the frame 27 on the axis 26 and ends below said frame; said post supports a wheel 34 which is independently motorized by means of a reduction unit 35 which is mounted on its axis and is branched off the hydraulic circuit used for the various actuations.

The wheel 34 can be raised and lowered by means of a hydraulic cylinder 36 which is rigidly coupled inside the post 33. As regards operation, when the arm 10 is inactive it is arranged, as shown in FIG. 1, with the portion 12 folded and the portion 11 arranged substantially vertically.

Figure 3:
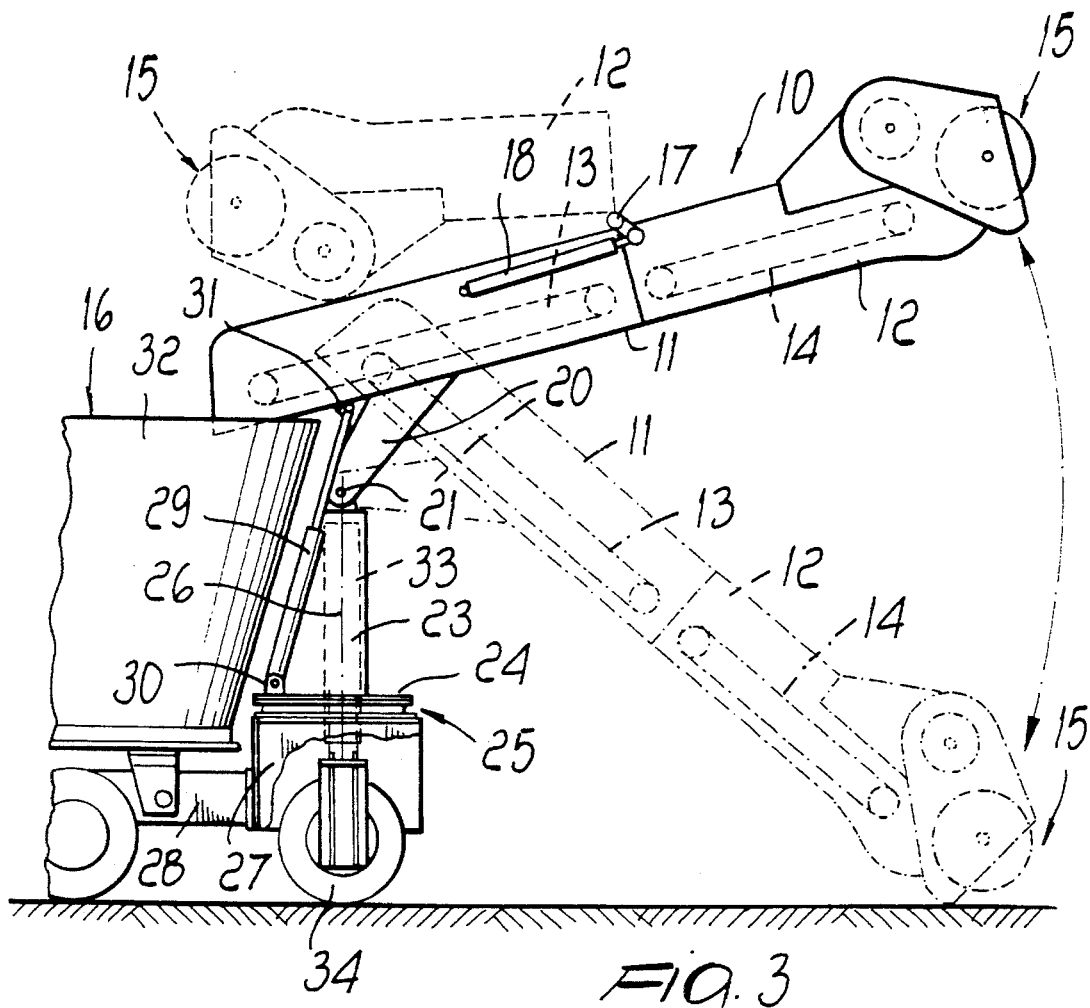
FIG. 3 is a partial side view of the shredder-mixer truck of FIG. 1, with the arm in the active position.

By actuating the cylinders 18 and 29, the arm 10 is made to assume, for use, the configuration of FIG. 3 by making it rotate downwards against the front of the silage while the mill 15 is running and with the two portions 11 and 12 extended to assume an active configuration in which they form a continuous conveying path.

Without moving the truck 16 from its position it is thus possible to rotate the arm 10 about the axis 26, by actuating the fifth wheel 25, so as to move the arm and allow to erode other parts of the silage.

Figure 4:
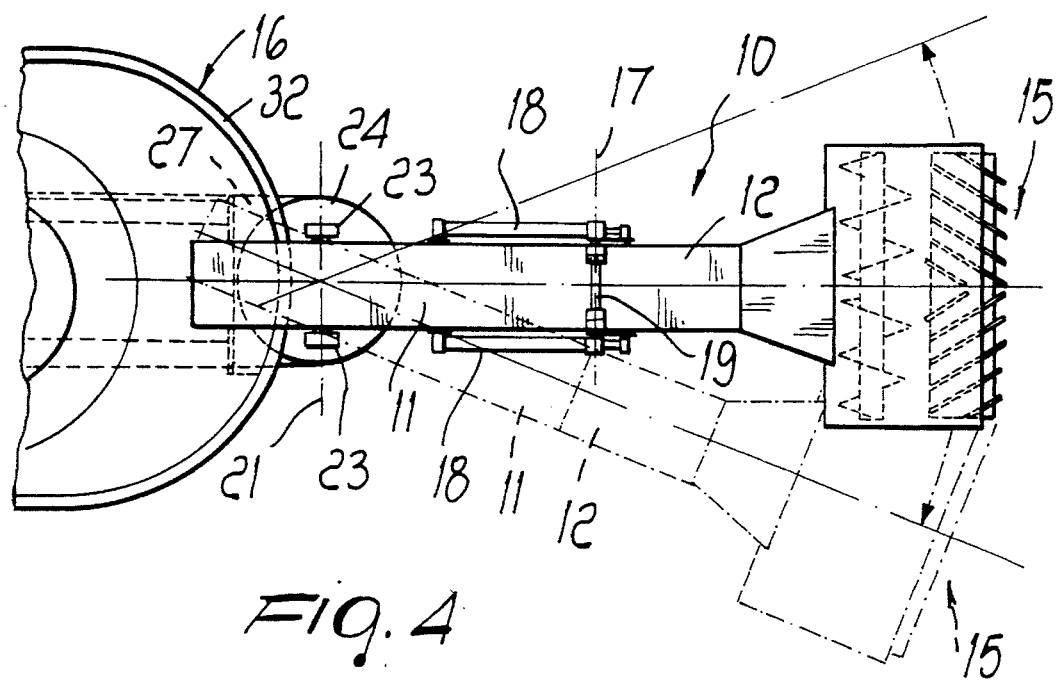
FIG. 4 is a partial top view of the truck of the preceding figures with the silage extractor and conveyor arm, illustrating the possibilities of motion about a vertical axis.

The maximum possible rotation angle is the one shown in FIG. 4 in dashed lines and is approximately comprised between −30° and +30°.

As regards the wheel 34, its lowering and resting on the ground allows first of all to avoid rocking due to the weight and the movements of the arm 10 and secondly, by virtue of its possibility to move, allows corrective maneuvers for positioning the rear part of the truck 16 directly from the control post 37 of the arm 10 (located laterally to the frame 27), without having to go to the front tractor and thus achieving better comfort and less waste of time.

If the arm 10 is mounted on a towed truck, the independently motorized wheel can also be replaced with transmissions and/or kinematic systems connectable to the engine of the tractor and associated with controls located on the control post of the arm 10.

In practice it has been observed that the intended aim and objects of the present invention have been achieved.

The possibility of the arm 10 to move about two perpendicular axes in fact allows to maneuver said arm so as to increase the speed of the operations for extracting the silage and/or loading it into the container of the shredder-mixer truck.

The arm can of course also be mounted on its own independent structure with its own independent self-propelled vehicle, and can also be of the telescopic type, i.e. composed of a plurality of portions which are mutually coupled and can slide on each other.

In practice, the materials employed, so long as they are compatible with the contingent use, as well as the dimensions, may be any according to the requirements.

What is claimed is:

1. Silage extractor and conveyor arm of the type having an elongated box-like structure, said arm comprising: a first end and a second end thereof; a lower supporting frame; a fifth wheel mounted on said supporting frame; a lower base mounted on said fifth wheel; a vertically extending support mounted on said lower base, said second end of said arm being articulated about a horizontal axis to said support; a mill for cutting and removing loose and ensiled material, said mill being connected to said first end of said arm; and conveying means for conveying removed material, said conveying means extending between said first and second ends of said arm, wherein said fifth wheel, said lower base and said support are rotatable about a vertical axis for rotating said arm about said vertical axis.

2. Silage extractor and conveyor arm according to claim 1, wherein said support comprises two parallel uprights extending from a lower base of said extractor, said arm being articulated to an upper end of said uprights.

3. Silage extractor and conveyor arm according to claim 2, further comprising a hydraulic cylinder being fixed between supports that extend respectively from said base and from said elongated box-like structure, said hydraulic cylinder being adapted to move said box-like structure about said horizontal axis.

4. Silage extractor and conveyor arm according to claim 1, wherein said lower supporting frame is fixed to a frame of a shredder-mixer truck for fibrous products for zootechny.

5. Silage extractor and conveyor arm according to claim 4, wherein said shredder-mixer truck is towed and provided with kinematic systems and transmissions connectable to an engine of a towing tractor, maneuvers for actuating and positioning said arm being controllable from a control post of said arm.

6. Silage extractor and conveyor arm according to claim 1, wherein said box-like structure comprises multiple mutually coupled portions which can slide with respect to each other.

7. Silage extractor and conveyor arm comprising: a lower supporting frame; a fifth wheel mounted on said supporting frame; a lower base mounted on said fifth wheel; a vertically extending support mounted on said lower base; at least one first and second portions, said second portion being articulated to said support for being rotatable with respect thereto about a horizontal axis, and said first and second portions being mutually connected for being extendable from an idle configuration to an active configuration in which said first and second portions form a continuous conveying path; an end mill for cutting and removing loose and ensiled material, said mill being connected to a free end of said first portion; and conveying means for conveying said removed material from said mill to a user machine, said conveying means extending along said conveying path in said active configuration of said arm, wherein said fifth wheel, said lower base and said support are rotatable about a vertical axis for rotating said arm about said vertical axis.

8. Silage extractor and conveyor arm according to claim 7, wherein said support comprises two parallel uprights extending from a lower base of said extractor, said arm being articulated to an upper end of said uprights.

9. Silage extractor and conveyor arm according to claim 8, wherein said supporting frame is fixed to the frame of a shredder-mixer truck for fibrous products for zootechny.

10. Silage extractor and conveyor arm according to claim 9, wherein said shredder-mixer truck is towed and provided with kinematic systems and transmissions connectable to an engine of a towing tractor, maneuvers for actuating and positioning said arm being controllable from a control post of said arm.

11. Silage extractor and conveyor arm according to claim 7, further comprising a hydraulic cylinder being fixed between supports that extend respectively from said base and from said arm, said hydraulic cylinder being adapted to move said arm about said horizontal axis.

12. Silage extractor and conveyor arm comprising: a lower supporting frame; a fifth wheel mounted on said supporting frame; a lower base mounted on said fifth wheel; a vertically extending support mounted on said lower base; at least one first and second portions, said second portion being articulated to said support for being rotatable with respect thereto about a horizontal axis, and said first and second portions being mutually connected for being extendable from an idle configuration to an active configuration in which said first and second portions form a continuous conveying path; an end mill for cutting and removing loose and ensiled material, said mill being connected to a free end of said first portion; conveying means for conveying said removed material from said mill to a user machine, said conveying means extending along said conveying path in said active configuration of said arm; and at least one motorized wheel mounted at said lower supporting frame, said wheel being independently actuatable for moving between a raised position and a lowered position in which the wheel rests on ground for supporting said arm in said active configuration, wherein said fifth wheel, said lower base and said support are rotatable about a vertical axis for rotating said arm about said vertical axis.

13. Silage extractor and conveyor arm according to claim 12, wherein said support comprises two parallel uprights extending from a lower base of said extractor, said arm being articulated to an upper end of said uprights.

14. Silage extractor and conveyor arm according to claim 12, wherein said lower supporting frame is fixed to a frame of a shredder-mixer truck for fibrous products for zootechny.

15. Silage extractor and conveyor arm according to claim 14, wherein said shredder-mixer truck is towed and provided with kinematic systems and transmissions connectable to an engine of a towing tractor, maneuvers for actuating and positioning said arm being controllable from a control post of said arm.

16. Silage extractor and conveyor arm according to claim 12, further comprising a hydraulic cylinder being fixed between supports that extend respectively from said base and from said arm, said hydraulic cylinder being adapted to move said arm about said horizontal axis.

17. Silage extractor and conveyor arm according to claim 12, wherein said arm comprises multiple mutually coupled portions which can slide with respect to each other.

18. Silage extractor and conveyor arm according to claim 12, wherein said wheel is supported by a telescopic post which is fixed to said supporting frame, said post being actuated for lifting and lowering said wheel with respect to the ground by a hydraulic cylinder.

19. Silage extractor and conveyor arm according to claim 12, wherein said arm comprises: a first and a second mutually articulated portions, each portion having respective conveyor means; and means which actuate said articulated portions to extend to said active configuration and respectively to fold to said idle configuration.

20. Silage extractor and conveyor arm according to claim 19, wherein said means which actuate said arm portions about said articulation are selected from means constituted by a pair of hydraulic cylinders and by a hydraulic reduction unit.

* * * * *